July 1, 1924.
R. RÜDENBERG
1,499,696
COOLING ELECTRIC MACHINERY
Filed June 21, 1921
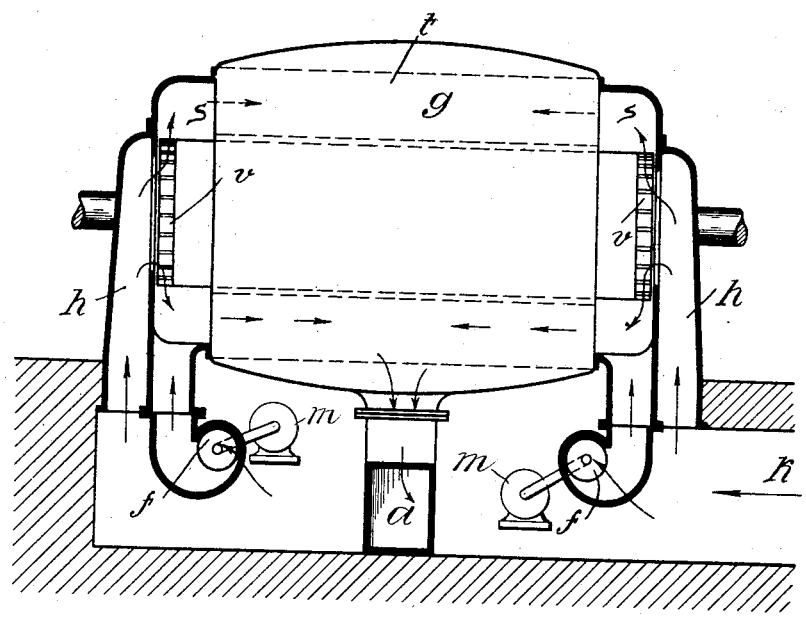
Inventor
Reinhold Rüdenberg
by Knight Bro.
attorneys Patented July 1, 1924.

1,499,696

UNITED STATES PATENT OFFICE.

REINHOLD RÜDENBERG, OF BERLIN-GRUNEWALD, GERMANY, ASSIGNOR TO SIEMENS-SCHUCKERTWERKE GESELLSCHAFT MIT BESCHRANKTER HAFTUNG, OF SIEMENSSTADT, NEAR BERLIN, GERMANY, A CORPORATION OF GERMANY.

COOLING ELECTRIC MACHINERY.

Application filed June 21, 1921. Serial No. 479,275.

*To all whom it may concern:*

Be it known that I, REINHOLD RÜDENBERG, a citizen of the German Empire, residing at Berlin-Grunewald, Germany, have invented certain new and useful Improvements in Cooling Electric Machinery, of which the following is a specification.

My invention refers to electric machinery and more especially to means for cooling same.

In self-ventilated electric machines it is frequently desired to work at a higher temperature than that corresponding to the normal and to the self-ventlation, and in this manner, for instance, to work the machine at a higher load by increasing the cooling action through applying a more effective ventilation. By the term "self-ventilating" electric machines, I imply that type, in which, by suitable design of its own moving elements or by provision of separate ventilating elements within the machine housing, which are directly operated by the machine, a ventilating air current is produced. Endeavours have been made to improve the ventilation by inserting into the air-duct of the self-ventilation system an external ventilation, such as an externally driven ventilator, connected in series with the self-ventilation system. It has, however, been ascertained that as a result of this arrangement, the pressure at the delivery side of the self-ventilator rises excessively, and although this excessive pressure may be overcome by increasing the working power and out-put of the self-ventilator, this cannot be effected in the case of the complete machine on account of the eddies and other troubles caused thereby, and, therefore, it is impossible to pass a materially greater quantity of air through the machine by connecting in series the additional external ventilation and the self-ventilation, than by using the latter exclusively.

This drawback may be avoided according to my invention, by admitting the additional air into the air-duct not in front of the internal ventilator, as hitherto practised, but immediately to the rear of the latter, i. e. at its delivery side, so as to put both systems, as it were, in parallel to each other.

In the drawings affixed to this specification and forming part thereof, a machine embodying my invention is illustrated diagrammatically by way of example. In the drawing $t$ is a turbo-generator with double-sided ventilation. The self-ventilators $v$ on the rotor draw the cooling air through their air-flues $h$ from the air-channel $k$ and force it into the end-shields $s$ containing the armature heads, and from there into the active material of the generator. The external ventilation, which preferably consists of special ventilators $f$, externally driven by motors $m$ and which may be used only in the case of heavy loads also draw air from the air-channel $k$ but force it into the end-shields $s$ immediately at the delivery side of the self-ventilators. The pressure resulting within the shields and behind the internal ventilators is moderate and it is now possible, to force considerably greater quantities of air through the machine, the additional amount of energy required by the additional ventilation being quite insignificant. It is advisable to keep the pressure of the additional ventilation slightly higher than that of the self-ventilator in normal action in order to prevent the self-ventilator from forcing air back through the external ventilation.

The air-currents from both ventilators combine while passing through the active material and leave the machine through the exhaust-channel $a$. It generally suffices to force cooling air in this manner into the end shields of the generator, but not into the interior of the rotor, since the increased quantity of air circulates also in the air gap between stator and rotor and effectively cools the surface of the rapidlly moving rotor.

The arrangement of external and internal ventilation in parallel according to my invention has also the further advantage as compared to the series-connection of internal and external ventilation, that the expensive devices for dis-connecting the external ventilation are dispensed with. In order to disconnect the external ventilation in the present arrangement it is only necessary to stop the motors $m$ and, if required, to close its delivery ducts by means of shutters (not shown).

The modification disclosed in the drawing represents an arrangement for a machine with double-sided ventilation. It is evident, however, that the invention may be applied to any other type of machines. The type or construction of the internal ventilation and of the external ventilation are also quite immaterial, the essential feature of my invention being that the external ventilation is connected to the interior ventilation immediately at the delivery side of the internal ventilator, i. e. operating in parallel thereto.

I claim:

In combination with a dynamo electric machine a ventilating arrangement having ventilating ducts and comprising a self-ventilator and an external ventilator, the delivery side of said external ventilator being connected immediately at the delivery side of said self-ventilator.

In testimony whereof I affix my signature.

REINHOLD RÜDENBERG.